United States Patent
Mixer

(10) Patent No.: US 11,432,453 B1
(45) Date of Patent: Sep. 6, 2022

(54) SEED ROPE

(71) Applicant: Silber James Mixer, Camp Point, IL (US)

(72) Inventor: Silber James Mixer, Camp Point, IL (US)

(*) Notice: Subject to any disclaimer, the term of this patent is extended or adjusted under 35 U.S.C. 154(b) by 339 days.

(21) Appl. No.: 16/903,573

(22) Filed: Jun. 17, 2020

(51) Int. Cl.
*A01C 1/04* (2006.01)
*D07B 1/02* (2006.01)

(52) U.S. Cl.
CPC .............. *A01C 1/042* (2013.01); *D07B 1/02* (2013.01); *D07B 2201/1028* (2013.01); *D07B 2201/1096* (2013.01); *D07B 2205/106* (2013.01); *D07B 2205/2003* (2013.01); *D07B 2501/2038* (2013.01)

(58) Field of Classification Search
CPC ........... A01C 1/042; A01C 7/048; A01C 1/04; D07B 2205/106
See application file for complete search history.

(56) References Cited

U.S. PATENT DOCUMENTS 6,460,473 B1 * 10/2002 Onodera ................ A01C 7/048
111/900
7,614,181 B2  11/2009 Ahm

OTHER PUBLICATIONS

Ren, Jin-Li, CN_110352741, "A Carrying Container, A Seedling Belt and Plant Planting Method" (translation), Oct. 22, 2019, 35 pgs <CN_110352741 pdf>.*
Ahm Poul, ES_2373221, "Tape Seed Holder That Includes Germinative Units Available Successively as well as a Procedure of Germinating of Such Tape", (translation) Feb. 1, 2012, 14 pgs <ES_2373221.pdf>.*
JP_6266778, "Method for Producing Seeded Mulching Material to Which Different Kinds of Plant Seeds Adhere", (translation) Jan. 24, 2018, 7 pgs <JP_6266778.pdf>.*
KR_101073959, "The Slope Greening Works for Which a Bio-Degradable Vegetation Net, this Production Technique and This Were Used" (translation), Oct. 17, 2011, 18 pgs <KR_101073959.pdf>.*
Wang et al, CN_110402653, "A Garlic Auxiliary for Planting and Transplanting Device" (translation), Nov. 5, 2019, 14 pgs <CN_110402653>.*

* cited by examiner

*Primary Examiner* — Tuan A Vu
(74) *Attorney, Agent, or Firm* — Sanchelima & Associates, P.A.; Christian Sanchelima; Jesus Sanchelima

(57) ABSTRACT

A biodegradable seed rope having predetermined positioning of seeds along with nutrients is disclosed. The rope may be made of but is not limited too any organic, biodegradable or water-soluble substantial grass/paper-based composition material. Additionally, the rope is infused with organic fertilizer, nutrients, and minerals to nurture the soil and support the growth of the seeds. The seeds are spaced apart equally along the seed rope. The spacing of the seeds are determined by the type of seed that is placed within the rope.

10 Claims, 5 Drawing Sheets

SEED ROPE

BACKGROUND OF THE INVENTION

1. Field of the Invention

The present invention relates to the field of gardening and, more particularly, to a seed rope that includes specific seed spacing along the length of the rope in equal increments determined by the type of seed being used.

2. Description of the Related Art

Several designs for gardening aids have been designed in the past. None of them, however, include a biodegradable seed rope having predetermined positioning of seeds along with nutrients. The rope may be made of but is not limited to any organic, biodegradable or water-soluble substantial grass/paper-based composition material. Additionally, the rope is infused with organic fertilizer, nutrients, and minerals to nurture the soil and support the growth of the seeds. The seeds are spaced apart equally along the seed rope. The spacing of the seeds are determined by the type of seed that is placed within the rope. In one embodiment, a V-shaped trough is formed within the soil of a ground surface. The seed rope is then placed within the trough and covered with soil. As a result, the need for an individual to handle individual small seeds and fertilizers is eliminated.

Applicant believes that a related reference corresponds to U.S. Pat. No. 7,614,181 issued for a seed tape that includes successively arranged germinating units having at least one carrier strip and at least on auxiliary layer of biodegradable, flexible material. Applicant believes another related reference corresponds to U.S. Pat. No. 6,460,473 issued for a seeding-growing sheet in the form of a laminate body consisting of a band-like support member and a porous sheet body laminated on the support member. However, the present invention differs from the cited references because they fail to disclose a seed rope having predetermined positioning of seeds along with nutrients. The present invention provides an effective way to properly space seeds for gardening.

Other documents describing the closest subject matter provide for a number of more or less complicated features that fail to solve the problem in an efficient and economical way. None of these patents suggest the novel features of the present invention.

SUMMARY OF THE INVENTION

It is one of the features of the present invention to provide an effective way to properly space seeds for planting.

It is another feature of this invention to provide a seed rope that increases the efficiency of gardening and reduces the hassles and messes associated with handling individual small seeds and fertilizers.

It is still another feature of the present invention to provide a seed rope that ensures that fertilizer, nutrients, and minerals are supplied to the plant.

It is yet another feature of this invention to provide such a device that is easy to implement and maintain while retaining its effectiveness.

Further features of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
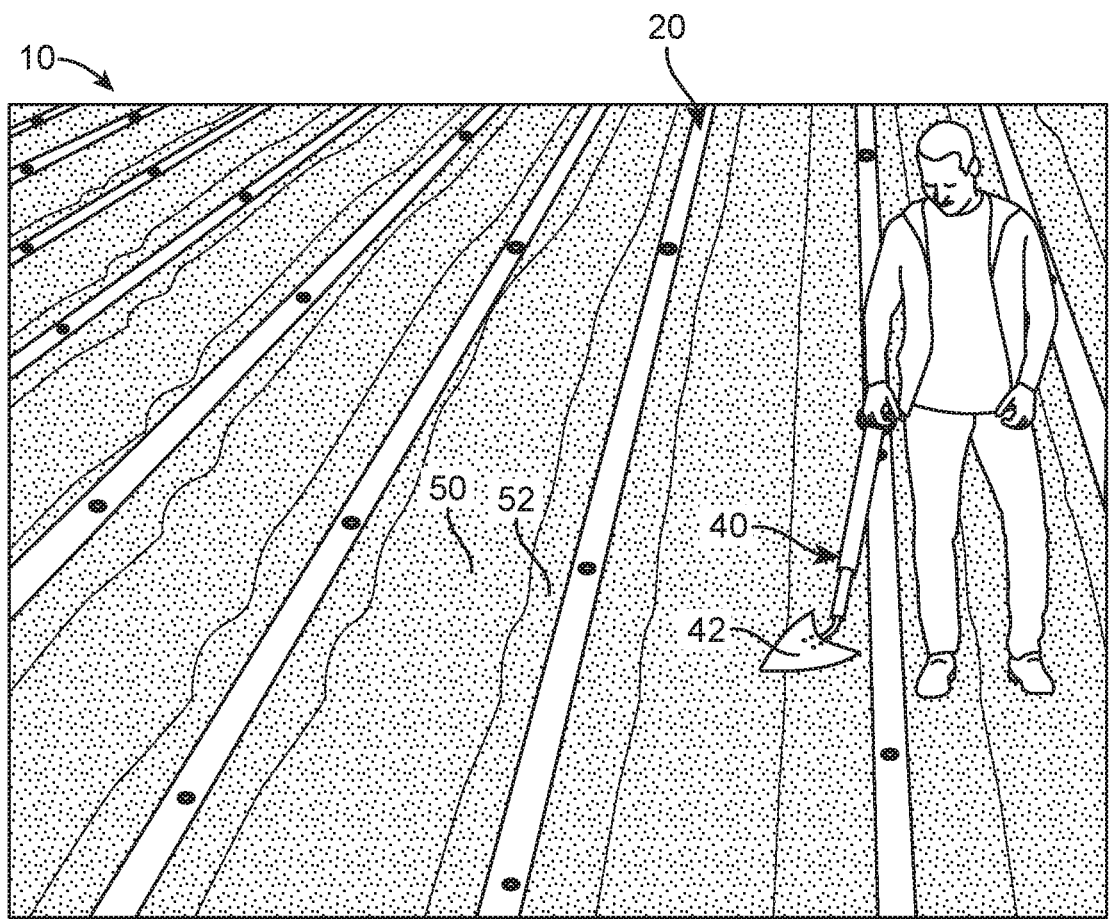
FIG. 1 represents an operational isometric view depicting system for a seed rope 10 in an operational environment in accordance to an embodiment of the present invention.
Figure 2:
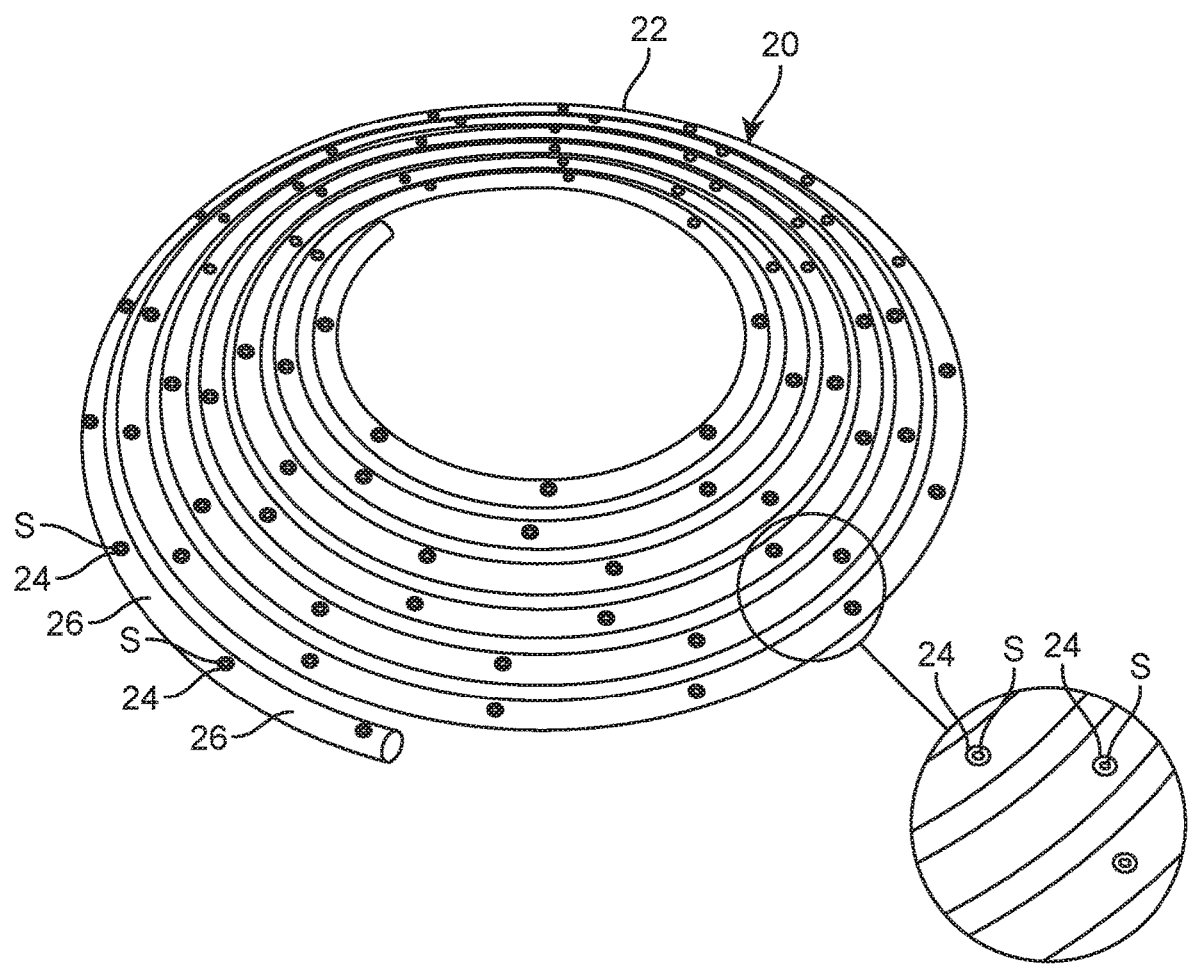
FIG. 2 shows an isometric view of rope assembly 20 in accordance to an embodiment of the present invention.
Figure 3:
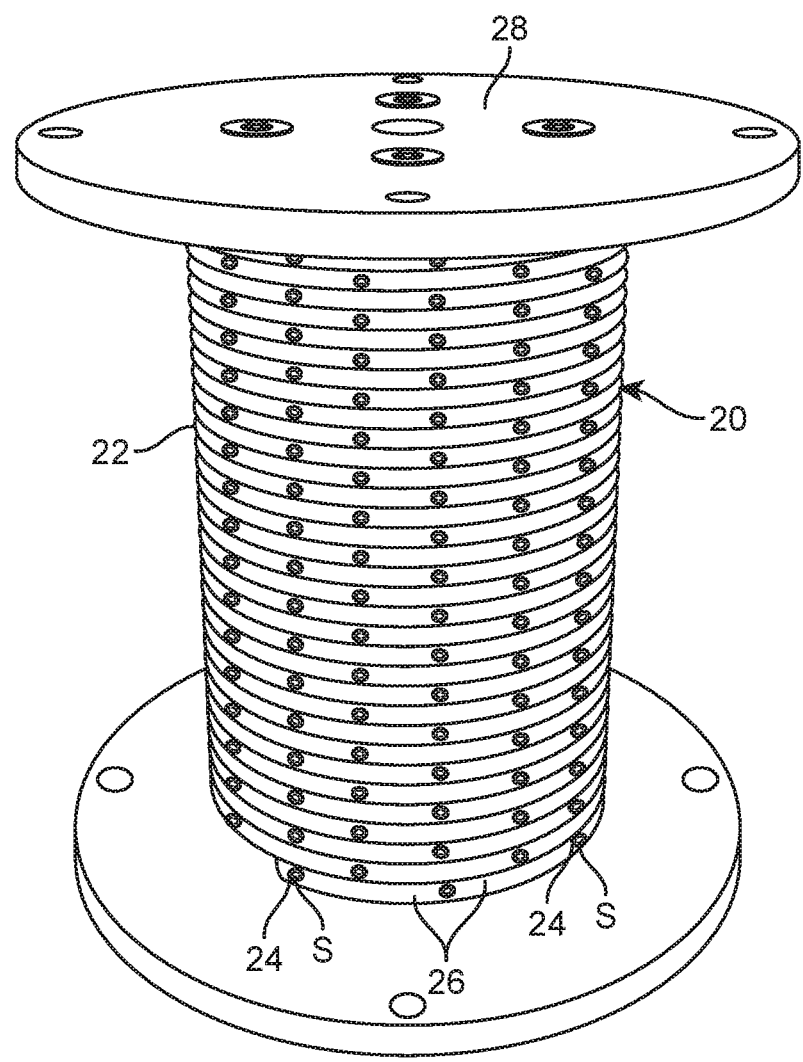
FIG. 3 illustrates an isometric view of rope assembly 20 stored in a spool 28 in accordance to an embodiment of the present invention.

Referring now to the drawings, where the present invention is generally referred to with numeral 10, it can be observed a system for a seed rope 10 which basically includes a rope assembly 20 and a gardening assembly 40.

Rope assembly 20 includes a rope 22 that may be made of but is not limited to an organic, biodegradable material. In other embodiments, rope 22 may be made of a water-soluble substantial grass or paper like composition material. Additionally, the seed rope 22 may resemble a traditional rope having an elongated cylindrical profile. Other embodiments may feature other rope designs such as ropes having a rectangular profile. Furthermore, rope 22 may be made of but is not limited to a polyethylene terephthalate material or a manila hemp material.

Additionally, the seed rope 22 may be provided in several well-known rope configurations. In one embodiment, rope 22 includes but is not limited to an eight-strand construction or a twelve-strand construction. In another embodiment, rope 22 includes but is not limited to eight plait constructions or a sixteen-plait construction. However, it should be understood that rope 22 may include any variation of construction. In one implementation, rope 22 is provided in lengths from 10 feet to 25 feet or any other length for bulk distribution. The rope material could be produced form any organic or biodegradable composition. Additionally, the material may also include any water-soluble substantial grass/paper-like composition material. The material may be derived from hemp, silk, wool, or other known rope compositions. Furthermore, rope 22 is configured to be infused with organic fertilizer, nutrients, and various minerals. In yet another embodiment, the material of rope 22 includes but is not limited to a combination of renewable coco fibers, sphagnum peat moss, and wood pulp.

Rope 22 further includes a plurality of housings 24 that equally spaced apart thereon. In one embodiment, housings 24 may be circular in shape and is of a suitable shape to comfortably receive a seed S therein. As a result, seeds S are evenly displaced along rope 22 thereby creating equal spaces 26. Each of rope 22 may receive one type of plant seed that is provided in a suitable spacing. In the present embodiment, the spacing of rope 22 is determined by the effective spacing that is recommended for each type of seed. For example, the spacing for rope 22 varies if a seed S for sweet corn or wheat.

In one implementation, a seed for sweet corn S is placed in thirty-inch rows, with a recommended population spacing of 33,000 plants per acre. This would result in an equal spacing 26 for 6½ inches apart on rope 22.

In one embodiment, rope 22 may be stored in a spool 28. Spool 28 may be made of but is not limited to a wooden material and may have a substantially cylindrical shape. A circular member is located on a top end and a bottom end of spool 28. In one implementation, rope assembly 20 is mounted onto spool 28 and provided to department stores to be sold. A specified length may be requested by a customer to then be cut and sold. In yet another embodiment, seed rope 10 may be provided in a rolled form with different lengths varying from ten feet, or twenty-five feet, or a hundred feet, or any other length for bulk distribution.

Figure 4:
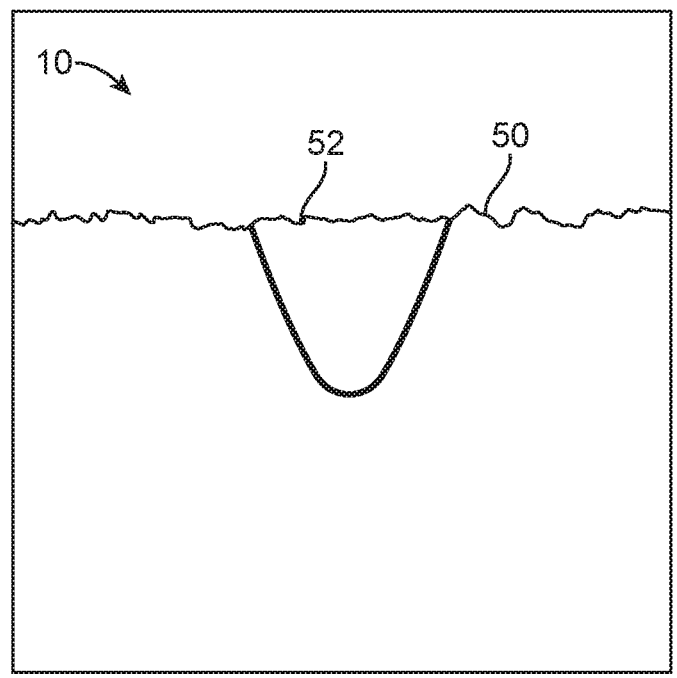
FIG. 4 is a representation of an end view of a soil environment depicting V-shaped trough 52 in accordance to an embodiment of the present invention.
Figure 5:
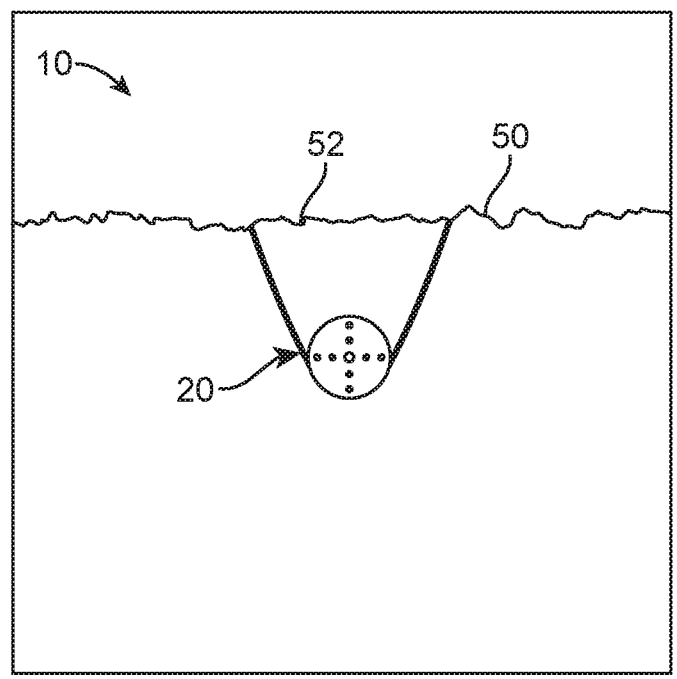
FIG. 5 shows an end view of a soil environment depicting V-shaped trough 52 having rope assembly 20 in accordance to and embodiment of the present invention.
Figure 6:
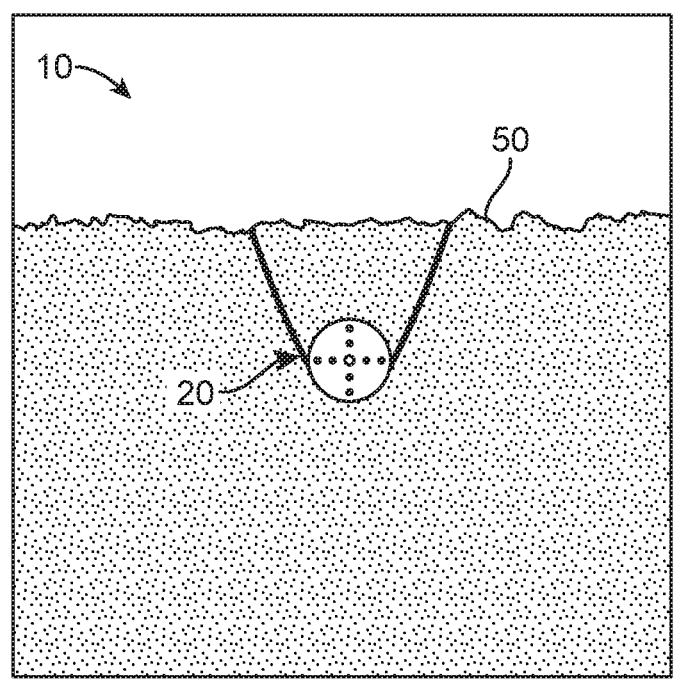
FIG. 6 illustrates an end view of a soil environment depicting V-shaped trough 52 having rope assembly 20 covered with soil therein in accordance to an embodiment of the present invention.

Gardening assembly 40 may include a V-shaped hoe 42 that is to be used by a user in a gardening environment. However, it should be understood that any variation of gardening equipment may be used. V-shaped hoe 42 may be provided as a traditional hoe known in the art having a handle and a hoe section having a substantially v-shaped configuration. Rope assembly 20 and gardening assembly 40 are then utilized to implement a method for the system for a seed rope 10. In one implementation, a user forms a v-shaped trough 52 in a soil environment 50 as seen in FIG. 4 of the provided drawings. This trough may have a predetermined length and depth that is determined by the type of soil and seeds that are being used. Furthermore, rope assembly 20 is then placed on the bottom of the trough 52 and laid out across its entire length as seen in FIG. 5 of the provided drawings. Lastly, a user then covers the trough 52 having rope assembly 20 therein with soil. This method eliminates the need for gardeners to individually handle seeds that are planted in the soil, as a result, a gardener saves time and is more efficient.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:
1. A system for a seed rope, comprising:
   a rope assembly including a rope having an elongated cylindrical profile made of an organic, biodegradable composition material, said rope having a plurality of housings with a circular shape each being equally spaced apart along said rope, wherein said plurality of housings each receive a seed to be impregnated within said rope, said rope being infused with an organic fertilizer, nutrients, and various minerals.
2. The system for a seed rope of claim 1 wherein said rope is made of a polyethylene terephthalate material.
3. The system for a seed rope of claim 1 wherein said rope is made of a manila hemp material.
4. The system for a seed rope of claim 1 further including a spool, said rope stored on said spool.
5. The system for a seed rope of claim 1 wherein said rope includes an 8-strand construction or a 12-strand construction.
6. The system for a seed rope of claim 1 wherein said rope includes an 8-plait construction or a 16-plait construction.
7. The system for a seed rope of claim 1 wherein said rope includes a combination of renewable coco fibers, sphagnum peat moss, and wood pulp.
8. The system for a seed rope of claim 1 wherein said rope is made of a hemp material or a grass material.
9. The system for a seed rope of claim 1 further including a method, comprising:
   a) forming a v-shaped trough in a soil environment having a predetermined length and depth;
   b) placing said rope assembly within a bottom of said v-shaped trough; and
   c) covering said v-shaped trough.
10. A system for a seed rope, comprising:
   a) a spool;
   b) a rope assembly including a rope having an elongated cylindrical profile made of an organic, biodegradable composition material, said rope having a plurality of housings each being equally spaced apart along said rope, wherein said plurality of housings are configured to store a seed therein, said rope configured to be infused with an organic fertilizer, nutrients, and various minerals, wherein said, said rope being stored on said spool; and
   c) a gardening assembly including a gardening V-shaped hoe to form a v-shaped trough in a ground environment, said rope placed within a bottom of said v-shaped trough, said v-shaped trough then being covered.

* * * * *